US007458706B1

(12) United States Patent
Liu et al.

(10) Patent No.: US 7,458,706 B1
(45) Date of Patent: Dec. 2, 2008

(54) LED LAMP WITH A HEAT SINK

(75) Inventors: Yi-San Liu, Shenzhen (CN); Xu-Hua Xiao, Shenzhen (CN); Li He, Shenzhen (CN)

(73) Assignees: Fu Zhun Precision Industry (Shen Zhen) Co., Ltd., Shenzhen, Guangdong Province (CN); Foxconn Technology Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/946,430

(22) Filed: Nov. 28, 2007

(51) Int. Cl.
*B60Q 1/06* (2006.01)

(52) U.S. Cl. ....................... 362/373; 362/294; 362/351; 362/356; 362/547; 362/800

(58) Field of Classification Search ................. 362/294, 362/351, 393, 800; 165/80.3; 361/697, 703; 257/712
See application file for complete search history.

(56) References Cited

U.S. PATENT DOCUMENTS 7,396,146 B2 * 7/2008 Wang ......................... 362/294
2005/0174780 A1 8/2005 Park
2007/0091632 A1 * 4/2007 Glovatsky et al. ........... 362/547

* cited by examiner

*Primary Examiner*—Stephen F Husar

(57) ABSTRACT

An LED lamp includes a lampshade, an LED module and a heat sink supporting and cooling the LED module. The heat sink includes a heat absorbing portion having a base plate for mounting the LED module thereon, and engaging with the lampshade for enclosing the LED module. A plurality of fins is formed on a top of the heat absorbing portion, and the fins extend outwardly beyond an outmost edge of the heat absorbing portion. A sidewall connects outmost ends of the fins. A plurality of apertures are defined between the outmost edge of the heat absorbing portion, the fins and the sidewall for allowing an airflow to flow from a bottom to a top of the heat sink via the apertures, thereby to effectively cool the heat sink and accordingly the LED module.

19 Claims, 5 Drawing Sheets

LED LAMP WITH A HEAT SINK

BACKGROUND OF THE INVENTION

1. Field of the Invention

The present invention relates to a light emitting diode (LED) lamp, and more particularly to an LED lamp having a heat sink for improving heat dissipation efficiency of the LED lamp.

2. Description of Related Art

The technology of LED has been rapidly developed in recent years from indicators to illumination applications. With the features of long-term reliability, environment friendliness and low power consumption, the LED is viewed as a promising alternative for future lighting products. LEDs are widely used in many fields such as street lamps. Nevertheless, the rate of heat generation increases with the illumination intensity. This issue has become a challenge for engineers to design the LED illumination, i.e. the LED lamp.

What is needed, therefore, is an LED lamp which has greater heat-transfer and heat dissipation capabilities, whereby the LED lamp can operate normally for a sufficiently long period of time.

SUMMARY OF THE INVENTION

An LED lamp includes a lampshade, an LED module and a heat sink supporting and cooling the LED module. The LED module includes a plurality of LEDs. The heat sink includes a heat absorbing portion having a base plate for mounting the LED module thereon. The lampshade is attached to a bottom of the heat absorbing portion for enclosing the LED module. A plurality of fins is formed on a top of the heat absorbing portion. The fins extend outwardly beyond an outer edge of the heat absorbing portion. A wall connects outmost ends of the fins. A plurality of openings are defined between the outer edge of the heat absorbing portion, the fins and the wall for allowing an airflow to flow from a bottom to a top of the heat sink, thereby cooling the heat sink and accordingly the LED module.

Other advantages and novel features of the present invention will become more apparent from the following detailed description when taken in conjunction with the accompanying drawings, in which:

BRIEF DESCRIPTION OF THE DRAWINGS

Many aspects of the present apparatus can be better understood with reference to the following drawings. The components in the drawings are not necessarily drawn to scale, the emphasis instead being placed upon clearly illustrating the principles of the present apparatus. Moreover, in the drawings, like reference numerals designate corresponding parts throughout the several views.

DETAILED DESCRIPTION OF THE INVENTION

Figure 1:
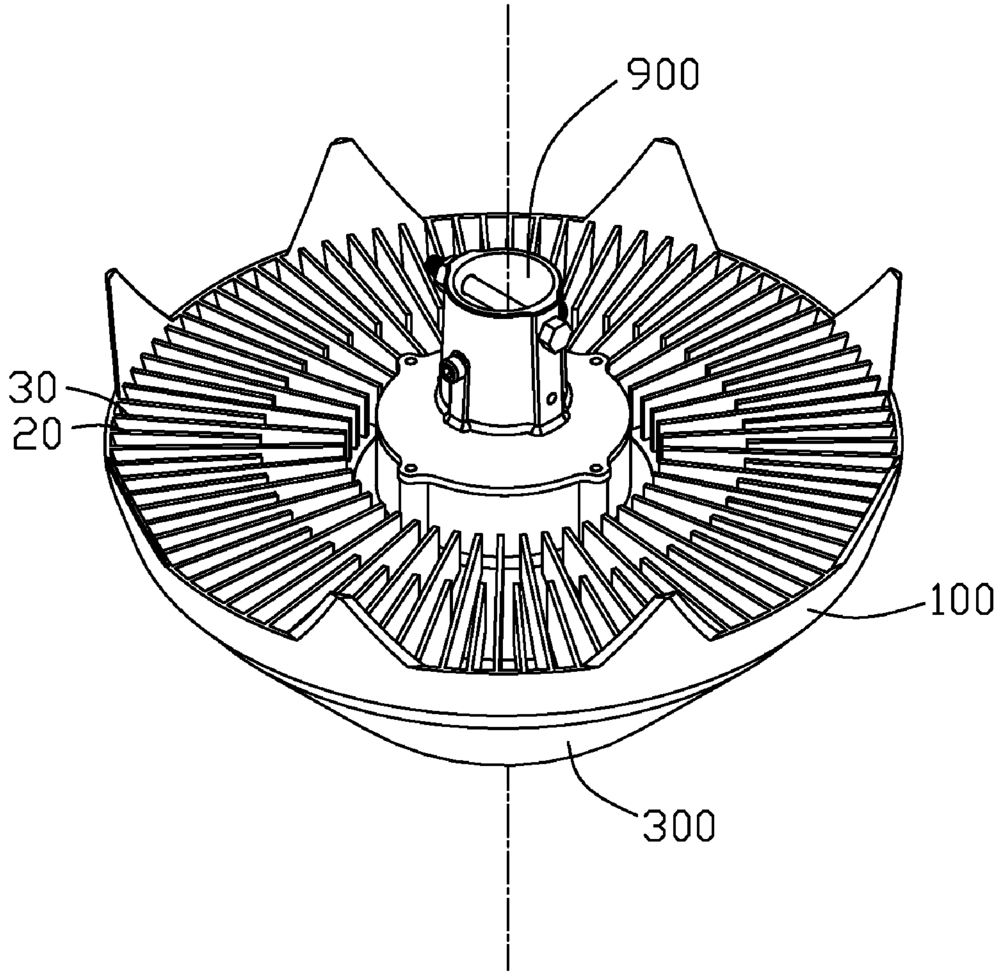
FIG. 1 is an assembled, isometric view of an LED lamp with a heat sink in accordance with a preferred embodiment of the present invention.
Figure 2:
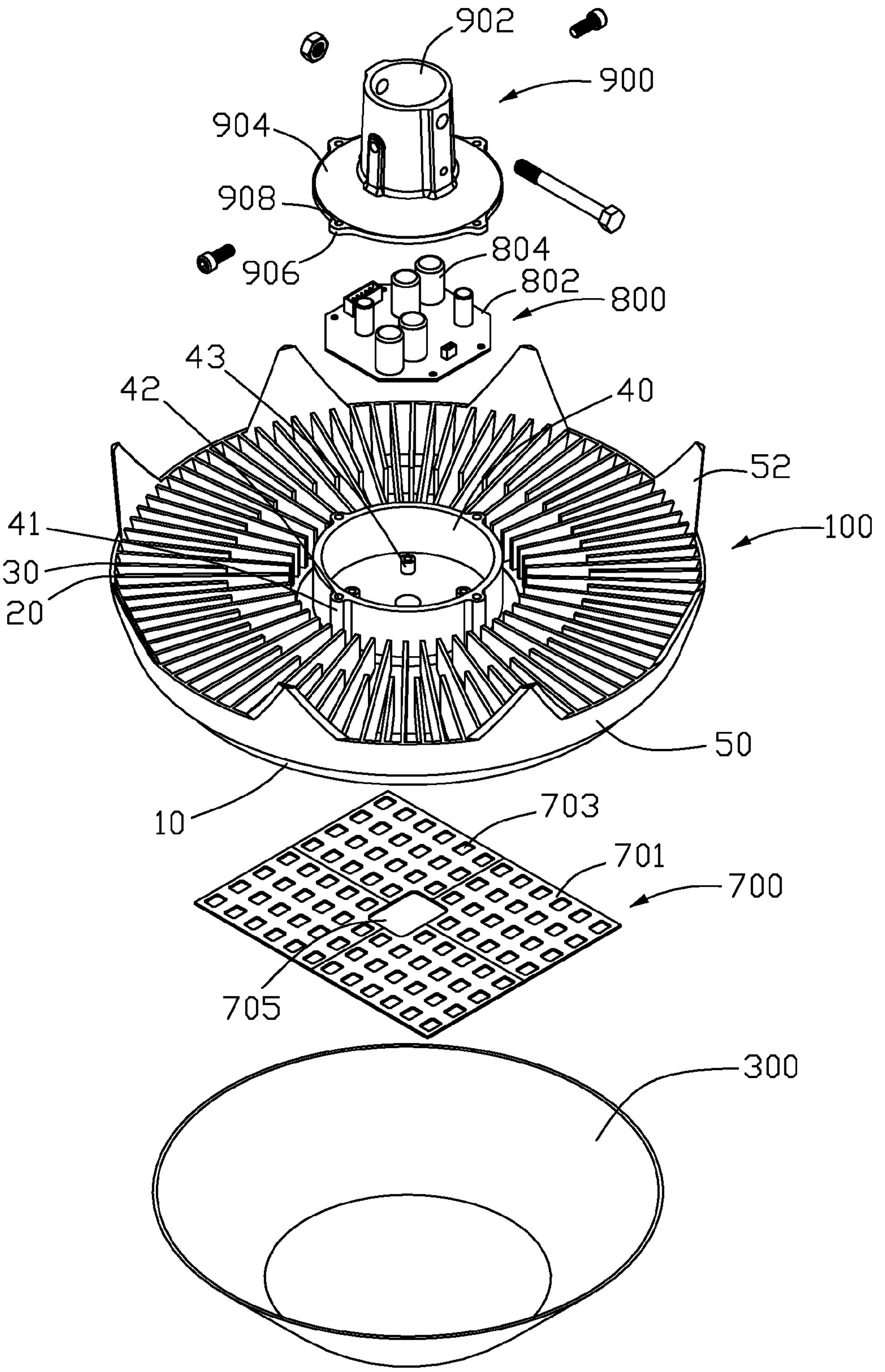
FIG. 2 is an exploded view of FIG. 1.

Referring to FIGS. 1-2, an LED lamp for a lighting purpose comprises an LED module 700, a heat sink 100 for supporting and cooling the LED module 700, and a lampshade 300 mounted below the heat sink 100 for enclosing and protecting the LED module 700. A driving circuit module 800 is received in the heat sink 100 and electrically connected to the LED module 700. A fixture 900 is located above the heat sink 100. The fixture 900 is used for connecting the LED lamp to a supporting structure, such as a supporting post of a lamp stand (not shown).

The LED module 700 comprises a plurality of LEDs (not shown) mounted on a printed circuit board 701. The LEDs are installed into mounting holes 703 defined in the printed circuit board 701, respectively, and electrically connected to the printed circuit board 701. A through hole 705 is defined in a centre of the printed circuit board 701. The printed circuit board 701 is further electrically connected to the driving circuit module 800 through wires (not shown) extending though the through hole 705 thereof and electrically connecting the printed circuit board 701 and the driving circuit module 800 together.

The lampshade 300 has a bowl-shaped construction with a concave surface (not labeled) facing upwardly and an opening (not labeled) in a center thereof. The lampshade 300 is generally made of plastic, glass, or other suitable material availing to transmit light.

The heat sink 100 has a configuration generally like an inverted frustum. The heat sink 100 is made of metal such as aluminum which has a high degree of heat conductivity. The heat sink 100 comprises a heat absorbing portion 10, a cylindrical mounting portion 40 extending upwardly from a centre of the heat absorbing portion 10, a plurality of first and second fins 20, 30, and a sidewall 50. The first and the second fins 20, 30 are formed on a top surface of the heat absorbing portion 10 and radially extended between the sidewall 50 and the mounting portion 40. The sidewall 50 connects outmost ends of the first and the second fins 20, 30 and encloses the first and the second fins 20, 30 therein.

Figure 3:
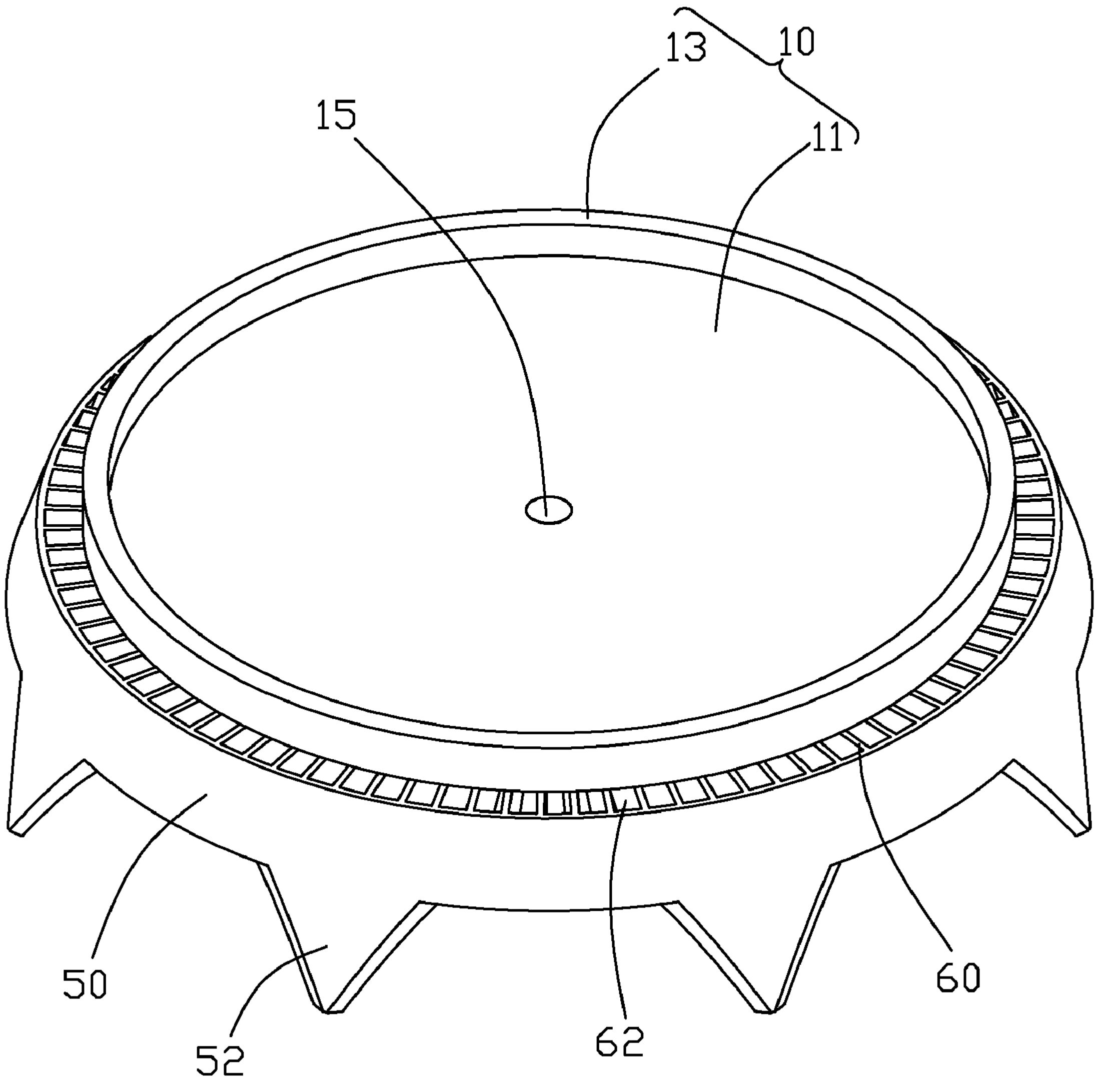
FIG. 3 is an inverted view of the heat sink of FIG. 2.
Figure 4:
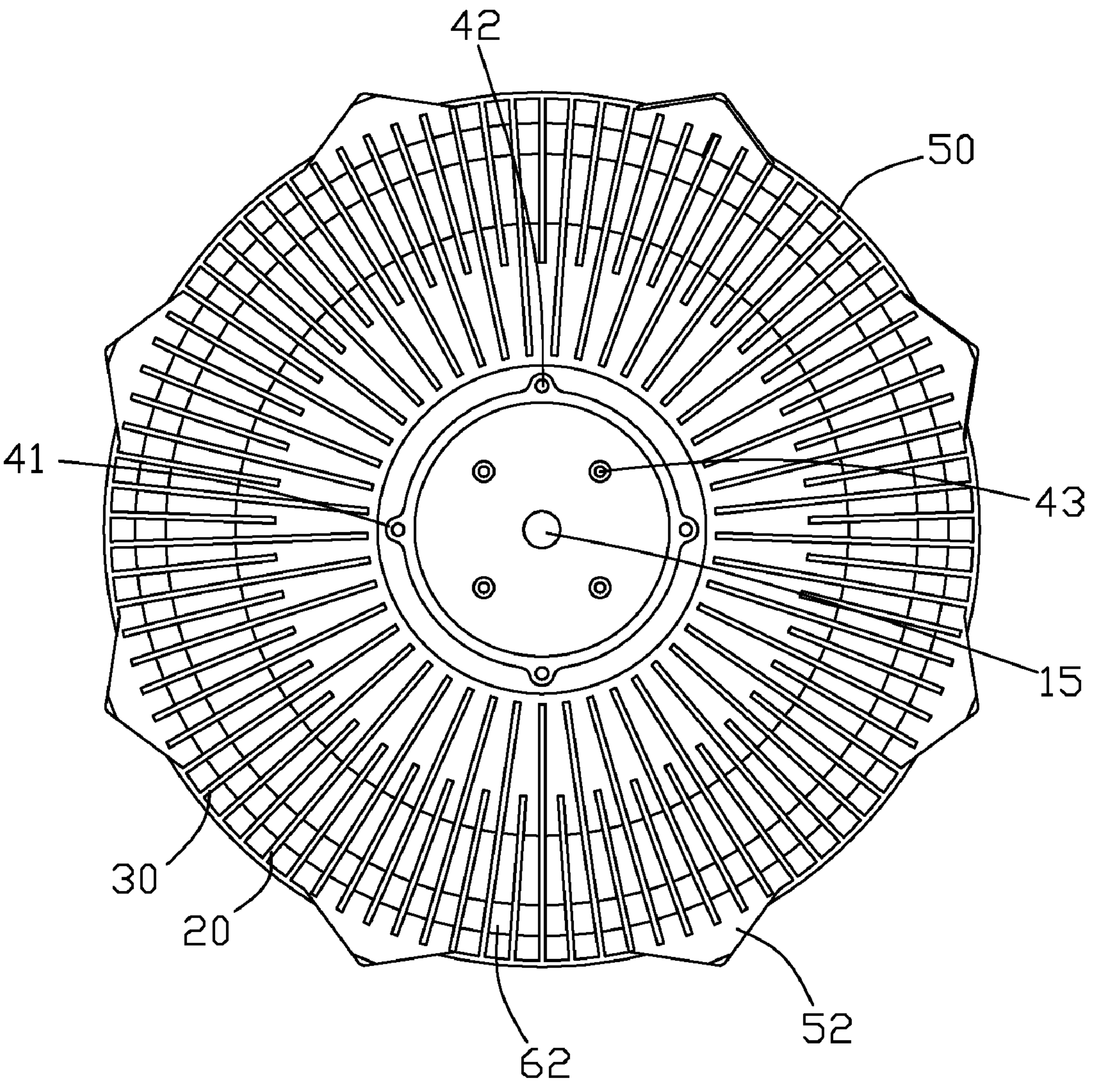
FIG. 4 is a top view of the heat sink of FIG. 2.

Referring also to FIGS. 3-4, the heat absorbing portion 10 has a disc-like configuration, and comprises a circular base plate 11 and an annular sidewall 13 extending downwardly from an outmost edge of the base plate 11. The first and second fins 20, 30 are formed on a top surface of the base plate 11. The first and second fins 20, 30 are alternated with each other, wherein the second fins 30 are shorter than the first fins 20. A gap (not labeled) is defined between two neighboring first and second fins 20, 30. The base plate 11 defines a central hole 15 at a centre thereof. The LED module 700 is adhered onto a bottom surface of the base plate 11 of the heat absorbing portion 10. The lampshade 300 engages with the annular sidewall 13 of the heat absorbing portion 10. Therefore, the heat absorbing portion 10 and the lampshade 300 together define an enclosed space (not labeled) accommodating the LED module 700 therein, whereby the LED module 700 can have a sufficient protection for avoiding a damage caused by an unexpected force acting on the LED lamp.

The cylindrical mounting portion 40 forms four connecting ribs 41 symmetrically protruding from an outer periphery thereof. The ribs extend along an axial direction of the cylindrical mounting portion 40. Each rib 41 defines a screw hole 42 therein for allowing a fixing member (not shown), such as a screw to screw therein thereby securing the fixture 900 to the mounting portion 40. Four nuts 43 are formed on the base plate 11 of the heat absorbing portion 10 and enclosed by the mounting portion 40. The nuts 43 are symmetrically disposed around the central hole 15 for mounting the driving circuit module 800 in the mounting portion 40 of the heat sink 100.

The first and the second fins 20, 30 are formed around the mounting portion 40. The first fins 20 have inner ends closer to the mounting portion 40 than the second fins 30. The outmost ends of the first fins 20 and the second fins 30 are extended outwardly beyond the outmost edge of the base plate 11 of the heat absorbing portion 10 and connect with the sidewall 50 of the heat sink 100.

The sidewall 50 has an annular configuration. The sidewall 50 has an upper diameter larger than a lower diameter thereof. The bottom and top circular edges of the sidewall 50 are coplanar with bottom and top edges of the first and the second fins 20, 30. The top portion of the sidewall 50 has eight triangular tabs 52 symmetrically extending upwardly therefrom. An annular area 60 is formed between the sidewall 50 and the outmost edge of the base plate 11 of the heat absorbing portion 10. A plurality of apertures 62 is defined in the annular area 60. Each aperture 62 is defined between two neighboring first and second fins 20, 30, the outmost edge of the base plate 11 and the sidewall 50. The apertures 62 extend vertically through the heat sink 100. Thus, an airflow can flow from a bottom to a top of the heat sink 100 through the apertures 62.

Referring to FIG. 2 again, the driving circuit module 800 comprises a printed circuit board 802 and a plurality of electronic components 804 located at a top surface of the printed circuit board 802. The driving circuit module 800 is embedded in the mounting portion 40 of the heat sink 100 for activating the LED module 700, controlling the brightness and color blending of the LED lamp.

The fixture 900 is located above of the heat sink 100 and comprises a cylindrical connecting portion 902 and a circular cover 904 extending outwardly from a bottom of the connecting portion 902. The cover 904 comprises four ears 906 symmetrically extending outwardly from a periphery thereof and a through hole 908 is defined in each of the ears 906. The through holes 908 are brought to be aligned with the screw holes 42 of the ribs 41 of the mounting portion 40 of the heat sink 100 upon securing the fixture 900 to the mounting portion 40. Screws (not shown) are used to extend through the through holes 908 and threadedly engage in the screw holes 42 of the heat sink 100 thereby mounting the fixture 900 on the mounting portion 40 of the heat sink 100. When the fixture 900 is mounted to the mounting portion 40, the circular cover 904 covers the driving circuit module 800 so that the driving circuit module 800 is not visible.

Figure 5:
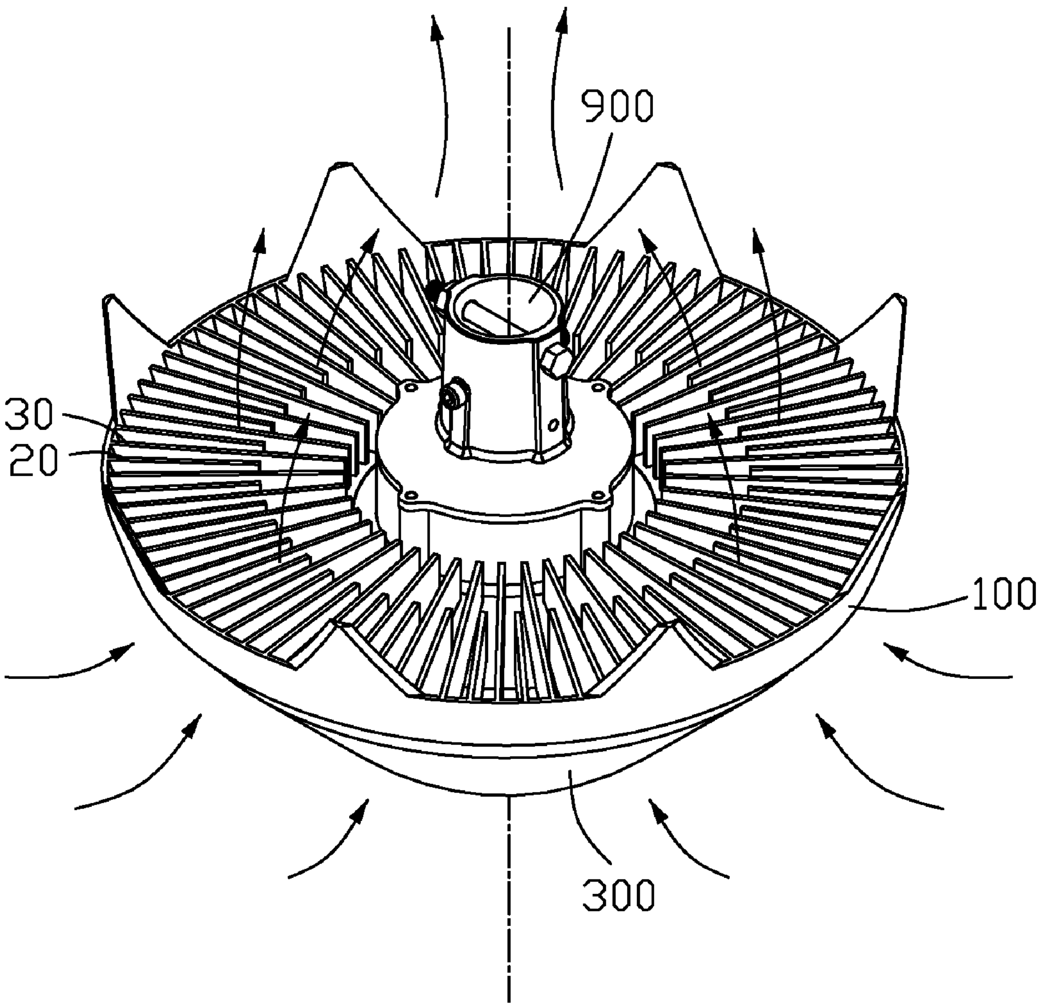
FIG. 5 is an isometric view showing an airflow flowing through the LED lamp of FIG. 1.

Referring to FIG. 5, in use, when the LEDs emit light, heat generated by the LEDs is absorbed by the heat absorbing portion 10 of the heat sink 100. The heat is then transferred to the first and the second fins 20, 30 of the heat sink 100 formed on the top surface of the heat absorbing portion 10. Finally the heat is dispersed into ambient cool air through the first and second fins 20, 30. The air in the apertures 62 of the annular area 60 of the heat sink 100 is heated. The heated air becomes lighter than the cool air, so that the heated air in the apertures 62 floats upwardly due to buoyancy and is replaced with the outside cooler air flowing upwardly from a lower portion of the heat sink 100 into the apertures 62 (as illustrated by arrows of FIG. 5). The apertures 62 in the annular area 60 of the heat sink 100 help natural air convection through the first and second fins 20, 30 of the heat sink 100, whereby the heat of the heat sink 100 and accordingly the heat generated by the LEDs of the LED module 700 can be effectively dissipated by the first and second fins 20, 30. Thus, the LED lamp in accordance with the present invention has an improved heat dissipating efficiency for preventing the LEDs from overheating.

It is believed that the present invention and its advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An LED lamp comprising:

a lampshade;

an LED module; and a heat sink supporting and cooling the LED module, the heat sink comprising:

a heat absorbing portion having a base plate for mounting the LED module thereon, and the heat absorbing portion engaging with the lampshade for enclosing the LED module;

a plurality of fins formed on a top of the heat absorbing portion, and the fins extending outwardly beyond an outmost edge of the heat absorbing portion; and a wall connecting outmost ends of the fins and enclosing the fins therein;

wherein a plurality of apertures are defined by the outmost edge of the heat absorbing portion, the fins and the wall for allowing an airflow to flow through the heat sink via the apertures.

2. The LED lamp of claim 1, wherein an area is formed between the wall and the outmost edge of the heat absorbing portion and the apertures are defined in the area.

3. The LED lamp of claim 1, wherein the fins of the heat sink comprises a plurality of radial first and second fins formed on the top of the heat absorbing portion, the first and second fins having different lengths.

4. The LED lamp of claim 3, wherein the first and the second fins are alternated with and spaced from each other and each of the first fins has a length longer than that of each of the second fins, inner ends of the first fins being closer to a centre of the heat sink than the second fins.

5. The LED lamp of claim 4, wherein the wall has an annular configuration and the wall has an upper diameter larger than a lower diameter thereof.

6. The LED lamp of claim 5, wherein bottom and top circular edges of the wall are coplanar with bottom and top edges of the first and the second fins.

7. The LED lamp of claim 6, wherein the wall of the heat sink has eight triangular tabs symmetrically disposed at a top thereof.

8. The LED lamp of claim 1, wherein the heat absorbing portion has a disc-shaped configuration and comprises an annular sidewall extending downwardly from the outmost edge of the absorbing portion and the lampshade engages with the sidewall of the heat absorbing portion for enclosing the LED module.

9. The LED lamp of claim 8, wherein the heat sink further comprises a cylindrical mounting portion extending upwardly from the base plate of the heat absorbing portion, the fins being radially formed around the mounting portion.

10. A heat sink for supporting and cooling an LED module comprising:

a heat absorbing portion;

a plurality of fins mounted on a top of the heat absorbing portion, and the fins extending outwardly beyond an outmost edge of the heat absorbing portion; and a wall connecting outmost ends of the fins and enclosing the fins therein, wherein an aperture is defined between two neighboring fins, the wall and the outmost edge of the heat absorbing portion.

11. The heat sink of claim 10, wherein the fins comprising first long fins and second short fins, the first and second fins being alternated with each other.

12. The heat sink of claim 10, wherein the heat sink has a configuration of an inverted frustum.

13. The heat sink of claim 11, wherein inner ends of the first fins are closer to a centre of the heat sink than the second fins.

14. The heat sink of claim 10, wherein the heat absorbing portion has a disc-shaped configuration and comprises a circular base plate connecting with the fins and an annular sidewall extending downwardly from an outmost edge of the base plate.

15. The heat sink of claim 14 further comprising a cylindrical mounting portion extending upwardly from the base plate of the heat absorbing portion and the fins are positioned radially around the mounting portion.

16. An LED lamp comprising:

a heat sink having a heat absorbing portion having a top face and a bottom face, a plurality of fins formed on the top face of the absorbing portion, a sidewall connecting with outermost ends of the fins, wherein an outmost edge of the heat absorbing portion, the fins and the sidewall cooperatively defined a plurality of apertures therebetween, the apertures extending through the heat sink; and an LED module attached to the bottom face of the heat absorbing portion of the heat sink.

17. The LED lamp of claim 16 further comprising a lampshade attached to the bottom face of the heat absorbing portion and enclosing the LED module.

18. The LED lamp of claim 16, wherein the heat sink further has a cylindrical mounting portion extending upwardly from the top face of the heat absorbing portion, a driving circuit module being received in the mounting portion and electrically connecting with the LED module for activating the LED module.

19. The LED lamp of claim 18 further comprising a fixture secured to the mounting portion and covering the driving circuit module, the fixture being adapted for connecting the LED lamp with a supporting structure.

* * * * *